F. L. METZGER.
AUTOMATIC MEASURING DEVICE.
APPLICATION FILED MAY 9, 1913.

1,079,874.

Patented Nov. 25, 1913.

Witnesses
Philip A. Hough
J. N. Sherwood

Inventor
F. L. Metzger,
By Franklin N. Hough
Attorney

UNITED STATES PATENT OFFICE.

FRANCIS LOREN METZGER, OF HARRISBURG, PENNSYLVANIA.

AUTOMATIC MEASURING DEVICE.

1,079,874.  Specification of Letters Patent.  Patented Nov. 25, 1913.

Application filed May 9, 1913. Serial No. 766,641.

*To all whom it may concern:*

Be it known that I, FRANCIS L. METZGER, a citizen of the United States, residing at Harrisburg, in the county of Dauphin and State of Pennsylvania, have invented certain new and useful Improvements in Automatic Measuring Devices; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic measuring tanks and the object in view is to produce a simple and efficient device of this nature having various details of construction and combinations and arrangements of parts which will be hereinafter fully described, shown in the accompanying drawings and then specifically defined in the appended claim.

Figure 1:
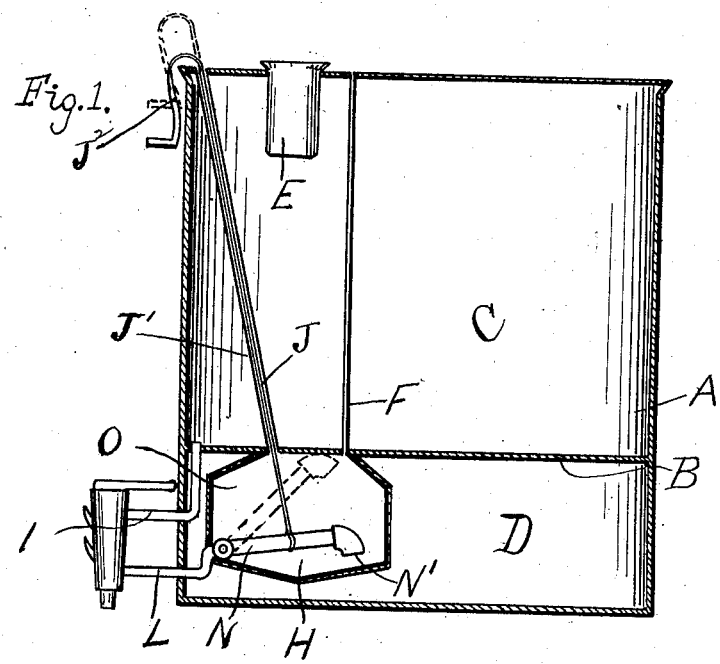
Figure 2:
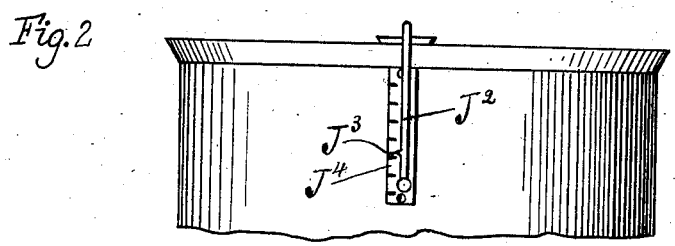
Figure 3:
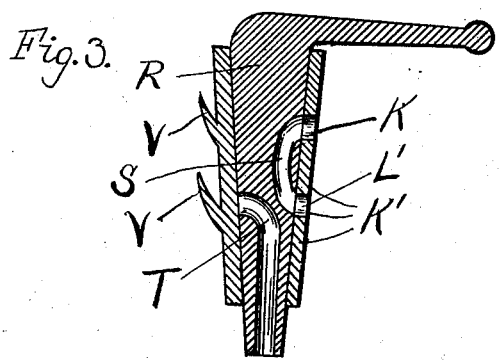

My invention is illustrated in the accompanying drawings, in which:

Figure 1 is a vertical central sectional view through a measuring tank made in accordance with my invention. Fig. 2 is a side elevation of a portion of the tank showing the scale on the side thereof, and Fig. 3 is a detail sectional view through a dispensing faucet.

Reference now being had to the details of the drawings by letter, A designates a tank divided by the partition B into two compartments, designated respectively by letters C and D. A filter E is placed in the upper end of the compartment C through which liquid passes into the compartment C, and F is a vent tube passing from the compartment H through the top of the tank. A pipe, designated by letter I, passes through the wall of the compartment D and extends through the partition B and opens into the compartment C and is adapted to communicate with the port K in the casing K' of the dispensing valve, as shown in Fig. 3 of the drawings, while a second pipe, designated by letter L, communicates with a port L' in the casing K and passes to and communicates with a pivotal measuring pipe N located within the compartment O. Said dispensing pipe N has an open end N' through which the liquid to be measured is adapted to pass. The valve, designated by letter R, has ducts S and T therein, the former of which is adapted, when the valve is turned in certain positions, to register with the ports K and L', while the duct T is designed, when the valve is in one position, to register with the port L'. Suitable hooks V project from the side of the valve casing and form means upon which a can to be filled may be hung.

A rod J is mounted in a tube J' which, at its lower end, opens through an aperture in the partition B and its upper end through an aperture in the top of the tank. Said rod has its end $J^2$ downwardly bent, forming a handle and has an indicating pointer $J^3$, shown in Fig. 2 of the drawings, adapted to move over the scale $J^4$.

The operation of my invention will be readily understood. When it is desired to fill the receptacle O with liquid, the valve R is moved to the positions shown in Fig. 3 of the drawings in which the liquid is allowed to pass from the compartment C through the pipe I, duct S and pipes L and N, thus filling the compartment C, it being understood that, when the apparatus is not in use, the valve is in the position shown in Fig. 3 in which the receptacle O is constantly kept filled from the supply above. When it is desired to measure out a certain amount from the receptacle O, it may be done, first by raising the handle $J^2$ of the rod J to a certain height opposite the indication for the quantity desired to be withdrawn, after which, by turning the valve R to an open position so that the port T will register with the port L', the port K will be blanked. This arrangement of the valve will allow the liquid to be dispensed down as far as the open end of the measure pipe is positioned.

By the provision of the measuring device embodying this feature, it will be noted that a simple and efficient mechanism is provided which will avoid leakage incident to tanks where moving parts pass through the wall of the measuring receptacle, the liquid being automatically fed to the measuring receptacle without the employment of any direct valve-operated openings between the supply tank and the measuring pipe.

What I claim to be new is:—

An automatic liquid dispensing tank provided with a scale and having a vented measuring receptacle therein, a valve casing with ports therein, a pipe connecting one of said ports with the supply chamber of the tank, a second pipe connecting the other port with the measuring receptacle, a ported valve within said valve casing, a movable measuring pipe communicating with said second pipe, a rod fastened to said measuring tube, an open-ended pipe through which said rod passes, a portion of the rod being bent to form a handle, and adapted to move adjacent to said scale to designate the quantities to be measured, as set forth.

In testimony whereof I hereunto affix my signature in presence of two witnesses.

FRANCIS LOREN METZGER.

Witnesses:
T. C. NEWELL,
H. V. FEYL.

Copies of this patent may be obtained for five cents each, by addressing the "Commissioner of Patents, Washington, D. C."